(12) United States Patent
Dempski

(10) Patent No.: US 9,773,286 B2
(45) Date of Patent: Sep. 26, 2017

(54) SYSTEM FOR PROVIDING EXTENSIBLE LOCATION-BASED SERVICES

(71) Applicant: Accenture Global Services Limited, Dublin (IE)

(72) Inventor: Kelly L. Dempski, Redwood City, CA (US)

(73) Assignee: Accenture Global Services Limited, Dublin (IE)

( * ) Notice: Subject to any disclaimer, the term of this patent is extended or adjusted under 35 U.S.C. 154(b) by 195 days.

(21) Appl. No.: 14/732,081

(22) Filed: Jun. 5, 2015

(65) Prior Publication Data

US 2015/0269687 A1 Sep. 24, 2015

Related U.S. Application Data

(63) Continuation of application No. 13/420,431, filed on Mar. 14, 2012, now abandoned.

(51) Int. Cl.
*G06Q 30/00* (2012.01)
*G06Q 50/12* (2012.01)
(Continued)

(52) U.S. Cl.
CPC .............. *G06Q 50/12* (2013.01); *G06N 5/02* (2013.01); *G06Q 30/0635* (2013.01);
(Continued)

(58) Field of Classification Search
CPC ............................... G06Q 50/12; G06Q 30/00
(Continued)

(56) References Cited

U.S. PATENT DOCUMENTS 5,128,862 A * 7/1992 Mueller ............... G06Q 10/087 705/15
5,839,115 A * 11/1998 Coleman ............ G06Q 10/087 705/15

(Continued)

FOREIGN PATENT DOCUMENTS

EP 1119211 B1 11/2004
KR 2006109779 A 10/2006
(Continued)

OTHER PUBLICATIONS

Clarke and Wright, "Scheduling vehicles from a central depot to a number of delivery points," Operations Res., 12:568-581 (1964).
(Continued)

*Primary Examiner* — Rokib Masud
(74) *Attorney, Agent, or Firm* — Fish & Richardson P.C.

(57) ABSTRACT

A system for providing location-based services to a mobile device regularly determines the location of the mobile device. Using the location of the device, the system queries a database of virtual geographic regions to determine if the location of the mobile device falls within one or more of the virtual geographic regions. The virtual geographic regions correspond to service entities that have purchased, rented, leased, or otherwise acquired the virtual geographic regions. The virtual geographic regions cover a certain area of a map. If the mobile device is within a virtual geographic region, the system notifies the mobile device. A location-based services application installed on the mobile device launches an applet for the entity that acquired the virtual geographic region within which the mobile device is located. When the mobile device is located within multiple overlapping virtual geographic regions, the system generates a prioritization scheme that defines which of the corresponding service
(Continued)

entities should be displayed on the mobile device, and in what order the service entities should be displayed.

19 Claims, 10 Drawing Sheets

(51) Int. Cl.
  *H04W 4/02* (2009.01)
  *H04L 29/08* (2006.01)
  *G06Q 30/06* (2012.01)
  *G06N 5/02* (2006.01)
  *G06Q 30/02* (2012.01)
  *H04M 1/725* (2006.01)

(52) U.S. Cl.
  CPC ....... *G06Q 30/0641* (2013.01); *H04L 67/306* (2013.01); *H04W 4/02* (2013.01); *H04W 4/021* (2013.01); *G06Q 30/0205* (2013.01); *H04M 1/72572* (2013.01); *H04W 4/026* (2013.01)

(58) Field of Classification Search
  USPC .................................................... 705/15, 16
  See application file for complete search history.

(56) References Cited

U.S. PATENT DOCUMENTS

| | | | |
|---|---|---|---|
| 5,930,474 A | 7/1999 | Dunworth et al. |
| 5,991,739 A | 11/1999 | Cupps et al. |
| 6,195,691 B1 | 2/2001 | Brown |
| 6,401,085 B1 | 6/2002 | Gershman et al. |
| 6,519,571 B1 | 2/2003 | Guheen et al. |
| 6,526,449 B1 | 2/2003 | Philyaw et al. |
| 6,535,880 B1 | 3/2003 | Musgrove et al. |
| 6,546,374 B1 | 4/2003 | Esposito et al. |
| 6,587,838 B1 | 7/2003 | Esposito et al. |
| 6,625,456 B1 | 9/2003 | Bussa et al. |
| 6,697,824 B1 | 2/2004 | Bowman-Amuah |
| 6,801,228 B2 | 10/2004 | Kargman |
| 6,845,361 B1 | 1/2005 | Dowling |
| 6,901,397 B1 | 5/2005 | Moldenhauer et al. |
| 6,903,723 B1 | 6/2005 | Forest |
| 6,912,398 B1 | 6/2005 | Domnitz |
| 6,920,431 B2 | 7/2005 | Showghi et al. |
| 6,922,567 B1 | 7/2005 | Rydbeck |
| 6,954,764 B2 | 10/2005 | Biswas et al. |
| 6,959,283 B1 | 10/2005 | White |
| 6,961,778 B2 | 11/2005 | Swartz et al. |
| 6,980,962 B1 | 12/2005 | Arganbright et al. |
| 7,003,500 B1 | 2/2006 | Driessen |
| 7,069,235 B1 | 6/2006 | Postelnik et al. |
| 7,072,856 B1 | 7/2006 | Nachom |
| 7,110,964 B2 | 9/2006 | Tengler et al. |
| 7,124,098 B2 | 10/2006 | Hopson et al. |
| 7,124,101 B1 | 10/2006 | Mikurak |
| 7,155,405 B2 | 12/2006 | Petrovich |
| 7,197,478 B2 | 3/2007 | Kargman |
| 7,200,614 B2 | 4/2007 | Reid et al. |
| 7,206,756 B1 | 4/2007 | Walsky |
| 7,233,655 B2 | 6/2007 | Gailey et al. |
| 7,239,881 B2 | 7/2007 | Lekutai |
| 7,270,267 B2 | 9/2007 | Yeung et al. |
| 7,287,002 B1 | 10/2007 | Asher et al. |
| 7,302,429 B1 | 11/2007 | Wanker et al. |
| 7,336,964 B2 | 2/2008 | Casey |
| 7,340,414 B2 | 3/2008 | Roh et al. |
| 7,386,318 B2 | 6/2008 | Moon et al. |
| 7,412,260 B2 | 8/2008 | Gailey et al. |
| 7,437,295 B2 | 10/2008 | Pitts, III et al. |
| 7,444,136 B1 | 10/2008 | Gazzard |
| 7,496,526 B2 | 2/2009 | Razumov |
| 7,532,947 B2 | 5/2009 | Waddington et al. |
| 7,590,538 B2 | 9/2009 | St. John |
| 7,603,287 B2 | 10/2009 | Kargman |
| 7,613,636 B2 | 11/2009 | Kargman |
| 7,652,558 B2 | 1/2010 | Lovegreen et al. |
| 7,664,736 B2 | 2/2010 | Jung et al. |
| 7,694,881 B2 | 4/2010 | Jung et al. |
| 7,698,228 B2 | 4/2010 | Gailey et al. |
| 7,699,219 B2 | 4/2010 | Drummond et al. |
| 7,730,160 B2 | 6/2010 | Moricz |
| 7,774,236 B2 | 8/2010 | Steres et al. |
| 7,776,372 B2 | 8/2010 | Hrudka |
| 7,778,884 B2 | 8/2010 | Bamborough et al. |
| 7,835,946 B2 | 11/2010 | Goren et al. |
| 7,840,591 B2 | 11/2010 | Lutnick |
| 7,860,757 B2 | 12/2010 | Cotton et al. |
| 7,882,150 B2 | 2/2011 | Badyal |
| 7,886,964 B2 | 2/2011 | Steinecker |
| 7,940,914 B2 | 5/2011 | Petrushin |
| 7,945,479 B2 | 5/2011 | Asher et al. |
| 7,970,118 B2 | 6/2011 | O'Dell, III |
| 7,974,873 B2 | 7/2011 | Simmons et al. |
| 8,031,858 B2 | 10/2011 | Miller et al. |
| 8,032,427 B1 | 10/2011 | Spreen et al. |
| 8,065,291 B2 | 11/2011 | Knorr |
| 8,068,599 B2 | 11/2011 | Sarin et al. |
| 8,069,070 B2 | 11/2011 | Papili et al. |
| 8,086,495 B2 | 12/2011 | Ansari et al. |
| 8,123,130 B2 | 2/2012 | Pentel |
| 8,126,777 B2 | 2/2012 | Postelnik et al. |
| 2002/0038261 A1 | 3/2002 | Kargman et al. |
| 2002/0049644 A1 | 4/2002 | Kargman |
| 2002/0067827 A1 | 6/2002 | Kargman |
| 2002/0103751 A1* | 8/2002 | Tanaka ................... G06Q 30/06 705/38 |
| 2002/0188492 A1 | 12/2002 | Borton |
| 2004/0111321 A1 | 6/2004 | Kargman |
| 2004/0143503 A1* | 7/2004 | Suthar ................... G06Q 50/12 705/15 |
| 2004/0158494 A1 | 8/2004 | Suthar |
| 2004/0267616 A1 | 12/2004 | Kargman |
| 2005/0015256 A1 | 1/2005 | Kargman |
| 2005/0021407 A1 | 1/2005 | Kargman |
| 2005/0045728 A1 | 3/2005 | Kargman |
| 2005/0049922 A1 | 3/2005 | Kargman |
| 2005/0108097 A1 | 5/2005 | McAleenan |
| 2005/0204014 A1 | 9/2005 | Yao et al. |
| 2005/0209914 A1 | 9/2005 | Nguyen et al. |
| 2005/0220009 A1 | 10/2005 | Kargman |
| 2005/0267811 A1 | 12/2005 | Almblad |
| 2006/0010037 A1 | 1/2006 | Angert et al. |
| 2006/0041482 A1 | 2/2006 | Awiszus et al. |
| 2006/0080163 A1 | 4/2006 | Sutcliffe |
| 2006/0080165 A1 | 4/2006 | Sutcliffe |
| 2006/0122896 A1 | 6/2006 | Parsley |
| 2006/0123098 A1 | 6/2006 | Asher et al. |
| 2006/0155753 A1 | 7/2006 | Asher et al. |
| 2006/0155770 A1 | 7/2006 | Asher et al. |
| 2006/0173754 A1 | 8/2006 | Burton et al. |
| 2006/0178943 A1 | 8/2006 | Rollinson et al. |
| 2006/0178951 A1 | 8/2006 | Rund, III |
| 2006/0200305 A1 | 9/2006 | Sheha et al. |
| 2006/0206390 A1 | 9/2006 | Asano |
| 2006/0218039 A1 | 9/2006 | Johnson |
| 2006/0293965 A1 | 12/2006 | Burton |
| 2007/0032240 A1 | 2/2007 | Finnegan et al. |
| 2007/0061225 A1 | 3/2007 | Havas |
| 2007/0073586 A1 | 3/2007 | Dev et al. |
| 2007/0088624 A1 | 4/2007 | Vaughn et al. |
| 2007/0106565 A1 | 5/2007 | Coelho |
| 2007/0150321 A1 | 6/2007 | Zhao et al. |
| 2007/0150375 A1 | 6/2007 | Yang |
| 2007/0162849 A1 | 7/2007 | Marciano |
| 2007/0208626 A1 | 9/2007 | Awiszus |
| 2007/0276651 A1 | 11/2007 | Bliss et al. |
| 2008/0082420 A1 | 4/2008 | Kargman et al. |
| 2008/0091786 A1 | 4/2008 | Jhanji |
| 2008/0097861 A1 | 4/2008 | Awiszus et al. |
| 2008/0176583 A1 | 7/2008 | Brachet et al. |
| 2008/0208697 A1 | 8/2008 | Kargman et al. |
| 2008/0229430 A1 | 9/2008 | Kargman |

(56) References Cited

U.S. PATENT DOCUMENTS

| | | |
|---|---|---|
| 2008/0262972 A1 | 10/2008 | Blake |
| 2009/0029687 A1 | 1/2009 | Ramer |
| 2009/0030778 A1 | 1/2009 | Zapata et al. |
| 2009/0048890 A1 | 2/2009 | Burgh |
| 2009/0099972 A1 | 4/2009 | Angert et al. |
| 2009/0106124 A1 | 4/2009 | Yang |
| 2009/0119180 A1 | 5/2009 | Moravsky et al. |
| 2009/0150193 A1 | 6/2009 | Hong et al. |
| 2009/0167553 A1 | 7/2009 | Hong et al. |
| 2009/0204492 A1 | 8/2009 | Scifo et al. |
| 2009/0240598 A1 | 9/2009 | Kargman |
| 2009/0245184 A1 | 10/2009 | Torres et al. |
| 2009/0261162 A1 | 10/2009 | Kargman et al. |
| 2009/0276347 A1 | 11/2009 | Kargman |
| 2009/0307079 A1 | 12/2009 | Martin, Jr. |
| 2009/0307096 A1 | 12/2009 | Antonellis |
| 2010/0023410 A1 | 1/2010 | Doan |
| 2010/0046510 A1 | 2/2010 | Koster et al. |
| 2010/0094715 A1 | 4/2010 | Kim et al. |
| 2010/0106607 A1 | 4/2010 | Riddiford et al. |
| 2010/0241707 A1 | 9/2010 | Burton et al. |
| 2010/0274633 A1 | 10/2010 | Scrivano et al. |
| 2010/0279665 A1 | 11/2010 | Hardin et al. |
| 2011/0011936 A1 | 1/2011 | Morandi et al. |
| 2011/0040654 A1 | 2/2011 | Lutnick et al. |
| 2011/0078637 A1 | 3/2011 | Inderrieden et al. |
| 2011/0082773 A1 | 4/2011 | Potter |
| 2011/0153457 A1 | 6/2011 | Hinks |
| 2011/0173041 A1 | 7/2011 | Breitenbach et al. |
| 2011/0196868 A1 | 8/2011 | Hans |
| 2011/0218839 A1 | 9/2011 | Shamaiengar |
| 2011/0250901 A1 | 10/2011 | Grainger et al. |
| 2011/0258058 A1 | 10/2011 | Carroll et al. |
| 2012/0016745 A1 | 1/2012 | Hendrickson |
| 2012/0022883 A1 | 1/2012 | Morrison |
| 2012/0036017 A1 | 2/2012 | Hasson |
| 2012/0036028 A1 | 2/2012 | Webb |
| 2012/0209730 A1* | 8/2012 | Garrett ............... G06Q 50/12 705/15 |
| 2012/0294520 A1 | 11/2012 | Mei |
| 2013/0244685 A1 | 9/2013 | Dempski |
| 2015/0271636 A1 | 9/2015 | Dempski |

FOREIGN PATENT DOCUMENTS

| | | |
|---|---|---|
| WO | WO 0073955 | 12/2000 |
| WO | WO 0111523 | 2/2001 |
| WO | WO 0173750 | 10/2001 |
| WO | WO 2007086684 | 8/2007 |

OTHER PUBLICATIONS

Cook, Chpt 1 "Challenges," In Pursuit of the Travelling Salesman: Mathematics at the Limits of Computation, Princeton University Press, 2011, 20 pages.

Edwards et al., "A Methodology and Implementation for Analytic Modeling in Electronic Commerce Applications," Electronic Commerce Technologies, Lecture notes in computer science, 2040:148-157, 2001.

Medji, Chpt 5 "Network of Queues," Stochastic Models in Queuing Theory, Elsevier Academic Press, 2002, 35 pages.

Mingozzi et al., "Dynamic programming strategies and reduction techniques for the traveling salesman problem with time windows and precedence constraints," Operations Research, 45:365-377 (1997).

Munkres, "Algorithms for the Assignment and Transportation Problems," J Soc Indust Appl Math., 5(1):32-38 (Mar. 1957).

Chinese Office Action for Application No. 201310090092.2, dated May 17, 2017, 12 pages (With English translation).

* cited by examiner

SYSTEM FOR PROVIDING EXTENSIBLE LOCATION-BASED SERVICES

CROSS REFERENCE TO RELATED APPLICATIONS

This application is a continuation of U.S. application Ser. No. 13/420,431, filed on Mar. 14, 2012, the disclosure of which is expressly incorporated herein by reference in its entirety.

BACKGROUND

Technical Field

This application relates to mobile applications. In particular, this application relates to a system for providing extensible location-based services to a mobile device.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

DETAILED DESCRIPTION

Figure 1:
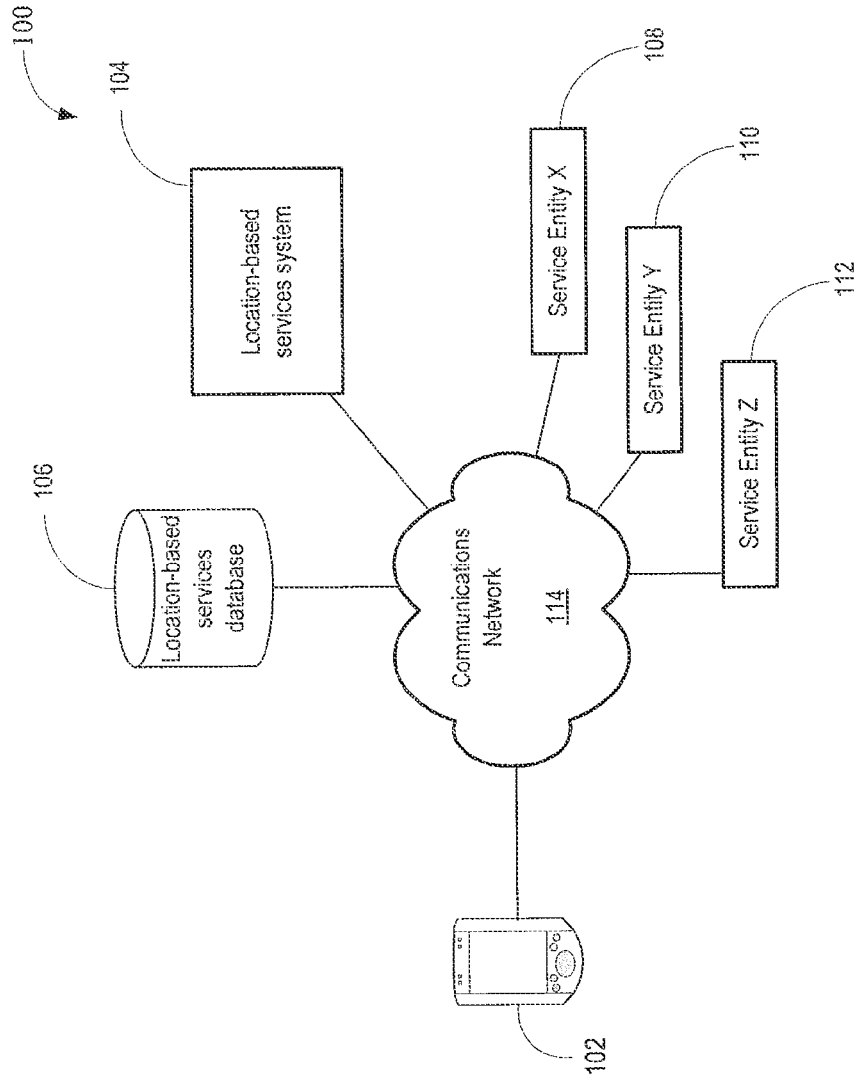
FIG. 1 shows an example of an architecture for providing an extensible location-based services to a mobile device.

FIG. 1 shows an example of an architecture 100 for providing an extensible location-based services to a mobile device. The architecture 100 includes a mobile device 102 equipped with a location-based service application, a location-based services system 104, a location-based services database 106, and service entities 108, 110, 112, each of which may communicate via a communications network 114. The mobile device 102 may be a cellular phone, tablet, smart phone, PDA or other mobile communication device configured to access the internet. The mobile device 102 has installed thereon a location-based services application configured to communicate with the system 104.

The communications network 114 may be any private or public communications network or combination of networks. The communications network 114 may be configured to couple a computing device, such as a server, system, database, or other network enabled device, to another device to enable communication of data between computing devices. The communications network 114 may generally be enabled to employ any form of computer-readable media for communicating information from one computing device to another. The communications network 114 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 114 may include any communication method by which information may travel between computing devices.

The service entities 108, 110, 112 each correspond to a vender of goods or services that purchased, rented, leased, or otherwise acquired virtual geographic regions from the provider of the location-based services system. The database 106 may store data corresponding to the virtual geographic region(s) of each service entity 108, 110, 112. The mobile device 102 transmits location data to the system 104 via the communications network. Based on the location data, the system 104 determines whether the location of the mobile device 102 falls in the proximity of the virtual geographic region of one or more of the service entities 108, 110, 112. If the location of the mobile device 102 falls in the proximity of the virtual geographic region of one of the service entities 108, 110, 112, the system 104 notifies the location-based services application installed on the mobile device 102. The application launches an applet corresponding to the identified service entity. The applet may access and load HTML-based pages corresponding to the identified service entity, which may provide sales information, product lists, coupons, a map of a nearby store, phone number, hours of operation, and other information corresponding to the service entity.

If the location of the mobile device 102 falls in the proximity of the virtual geographic regions of multiple service entities 108, 110, 112, the system 104 may execute a conflict resolution process to determine the multiple service entity about which to notify the mobile device 102. In another example, the application may be configured to display a menu to a user that prompts the user to select which of the identified service entity applets to launch. In this example, the conflict resolution process may include a determination of what order to list the identified multiple service entities on the menu, or whether to omit any of the identified service entities from the menu.

If the location of the mobile device 102 does not fall within the proximity of the virtual geographic region of any service entity, the system 104 may determine whether there are any service entities corresponding to nearby virtual geographic region about which to notify the user of the mobile device 102.

Figure 2:
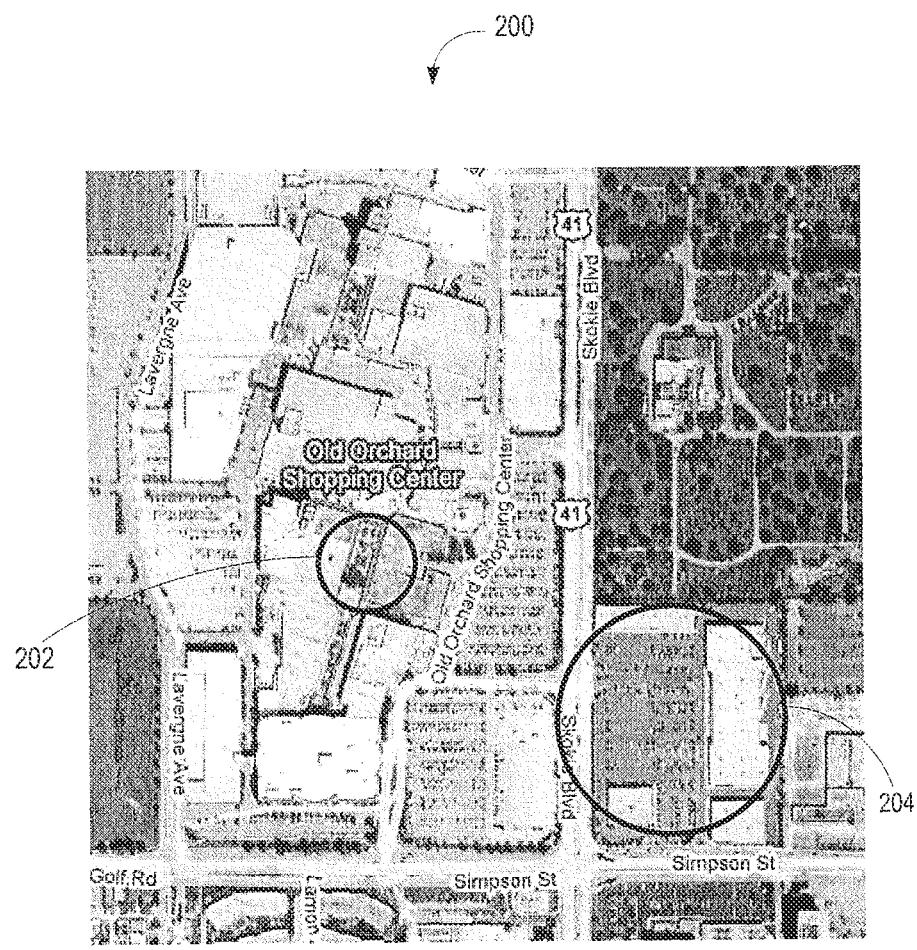
FIG. 2 shows examples of virtual geographic regions that are defined as circles.
Figure 3:
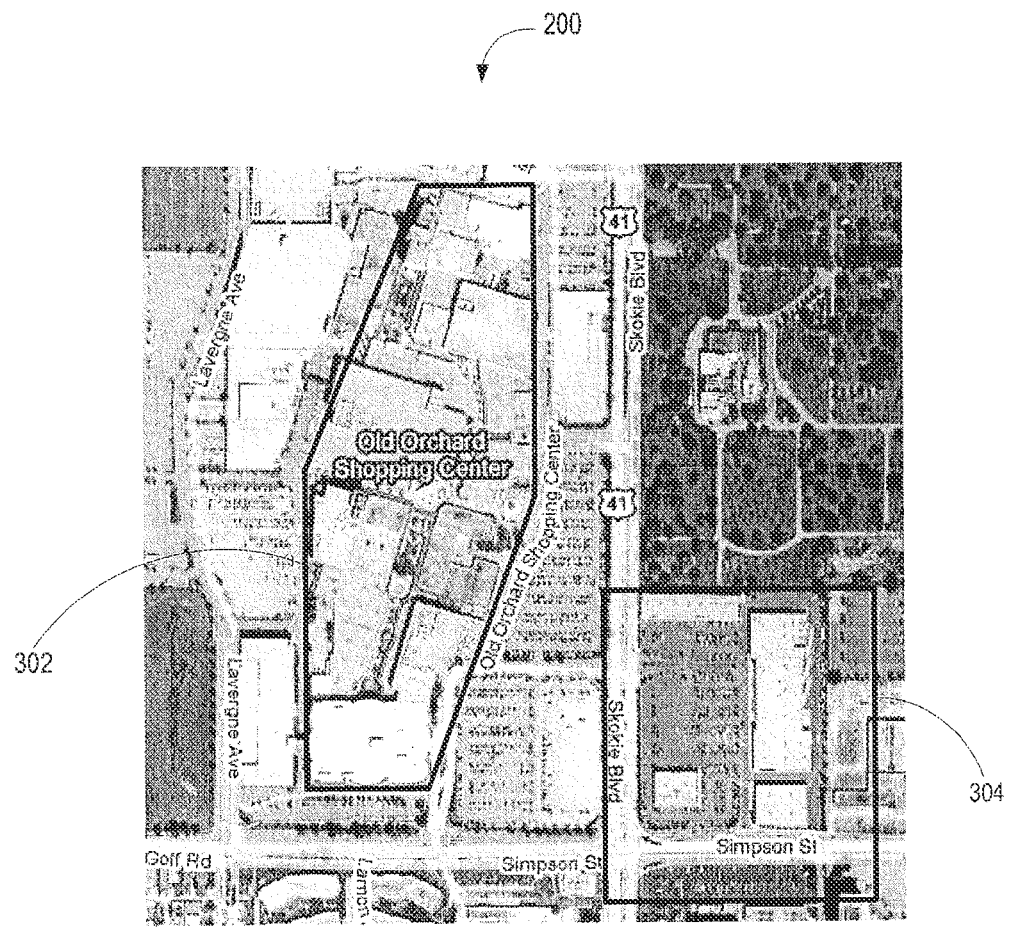
FIG. 3 shows examples of virtual geographic regions that are defined as polygons.

FIGS. 2-3 show a map 200 including examples of virtual geographic regions that may be purchased, rented, leased, or otherwise acquired by a service entity. FIG. 2 shows examples of virtual geographic regions 202 and 204 that are defined as circles. In particular, the geographic regions 202 and 204 may be defined by a geographic coordinate (e.g., longitude and latitude) and a radius. In FIG. 2 region 204 is defined by a larger radius than region 202.

FIG. 3 shows examples of virtual geographic regions 302 and 304 that are defined as polygons. The polygons may be defined by geographic coordinates. For example, six geographic coordinates may form a six sided polygon region. Borders of the virtual geographic regions may also be defined, partly or wholly, by pre-defined geographic regions such as a zip code, city limit, etc. The virtual geographic region may be defined by a combination of the above examples as well.

The boundaries of the virtual geographic regions may be defined by the service entity purchasing, renting or leasing the region. For example, the service entity may select the geographic coordinate and radius defining their circular virtual geographic region, or may select the geographic coordinates defining the polygonal virtual geographic region. Monetization of the virtual geographic regions may be based on area as well as location. For example, a region covering more area may cost more than a smaller region. As another example, a region in a densely populated area may cost more than a region of the same size in a less populated area.

Virtual geographic regions corresponding to different service entities may overlap. When a mobile device enters an area covered by multiple virtual geographic regions, the location-based services system may perform conflict resolution, which is discussed in more detail below. In addition, a service entity may also purchase exclusive rights to a particular virtual geographic region.

Figure 4:
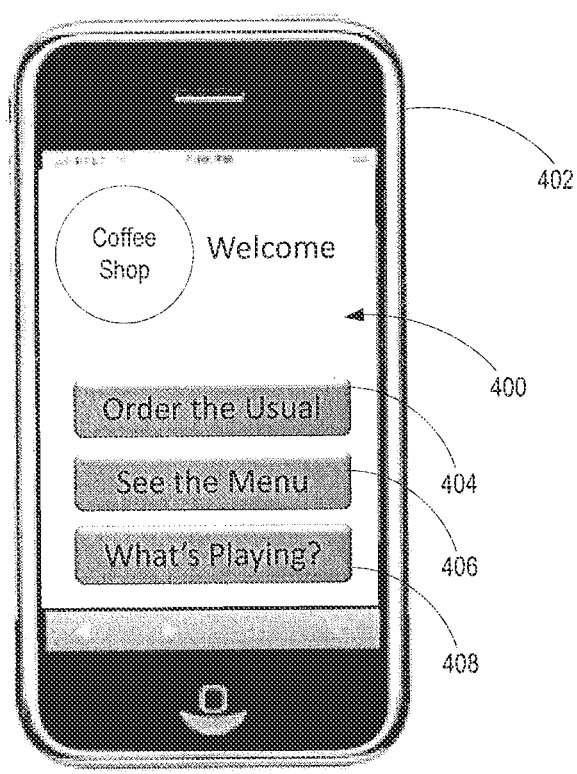
FIG. 4 shows an example of an applet interface displayed by the location-based mobile application installed on a mobile device.

FIG. 4 shows an example of an applet interface 400 displayed by the location-based mobile application installed on a mobile device 402. In this example the mobile device 402 was determined to be within a virtual geographic region corresponding to a coffee shop. The location-based services system notifies the application installed on the mobile device 402 that the device 402 is within the identified virtual geographic region and launces the applet and displays the applet interface 400 corresponding to the coffee shop. The display 402 may be an initial applet window displayed when the corresponding applet is launched. The initial applet window provides the user includes menu items 404, 406 and 408. The applet may allow the user to view the menu (menu item 406) and place an order. The applet may allow the user of the mobile device 402 to order the usual (menu item 404). The applet may collect purchasing data about the user's purchases at this coffee shop, or at coffee shops in general to determine what order to place when the user clicks on the "Order the Usual" menu item 404. In another example, the applet may allow the user to manually input a product that is purchased when the user clicks on the menu item 404. The applet may also allow the user to determine what music is playing in the corresponding coffee shot (menu item 408).

Figure 5:
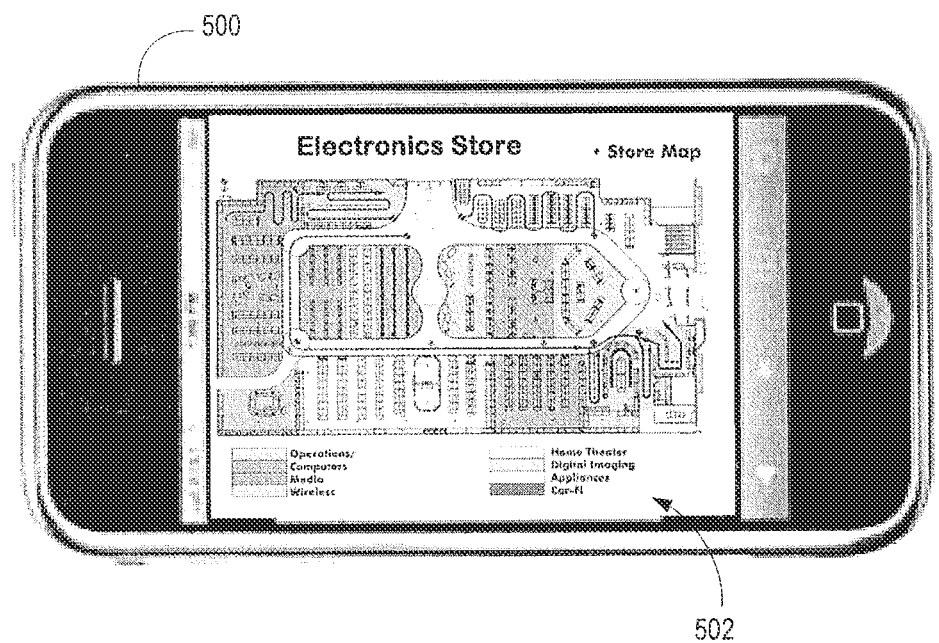
FIGS. 5-7 show another example of an applet launched on a mobile device.
Figure 6:
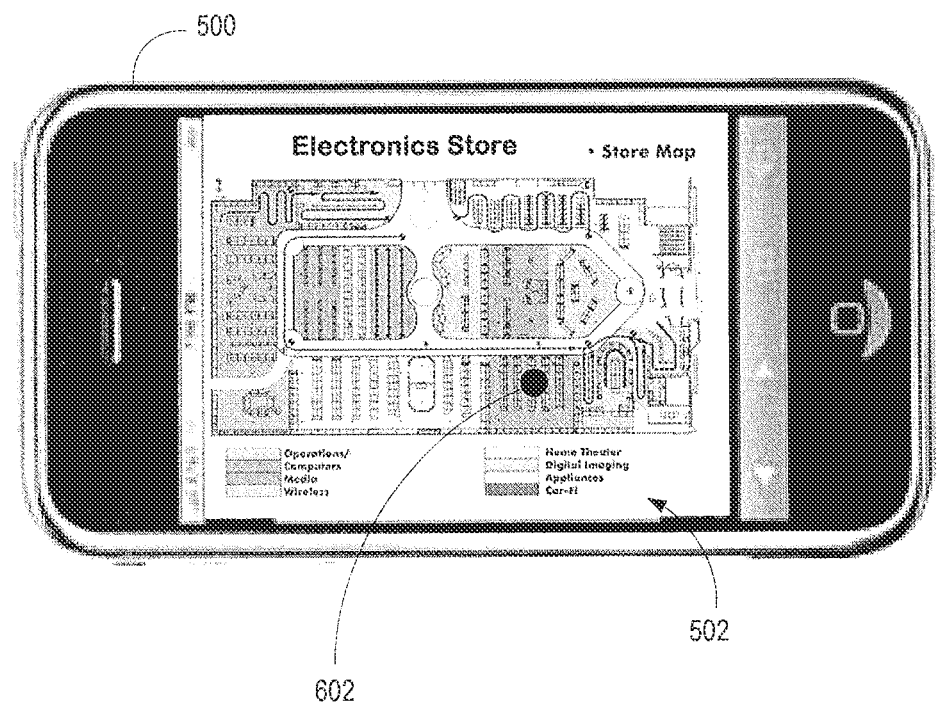
Figure 7:
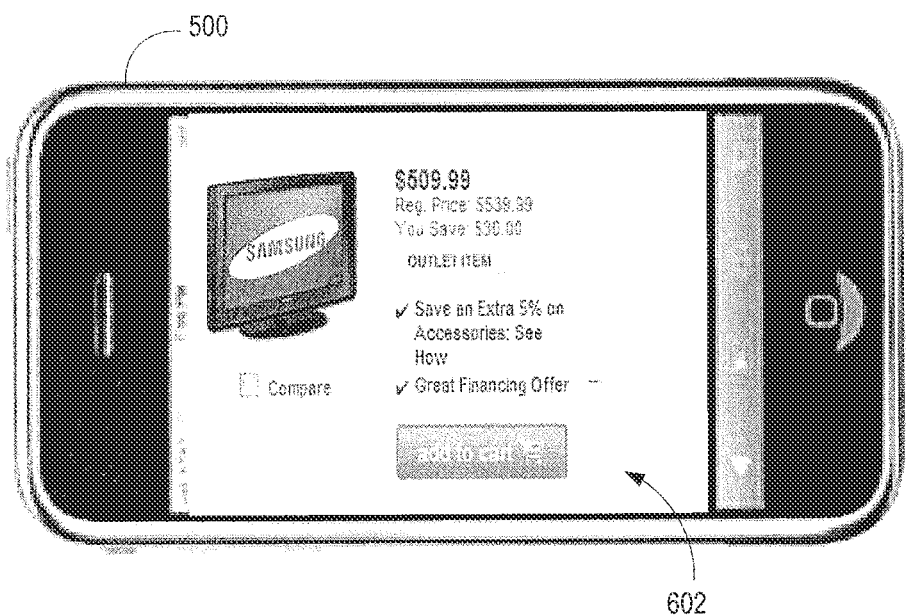

FIGS. 5-7 show another example of an applet launched on a mobile device 500. In this example the mobile device 500 is determined to be within a virtual geographic region corresponding to an electronics store. FIG. 500 shows that the subsequently launched applet may provide a layout 502 of the nearby retail store. FIG. 6 shows that the applet may overlay a sales or promotion indicator 602 over the layout. The indicator 602 may indicate a location within the store of a sale or promotion. If the user selects the indicator 602, the applet may display a sale or promotion window 702, as shown in FIG. 7. The applet may integrate with the electronics store's website to enable the user to make purchases from the retail store using the applet.

Figure 8:
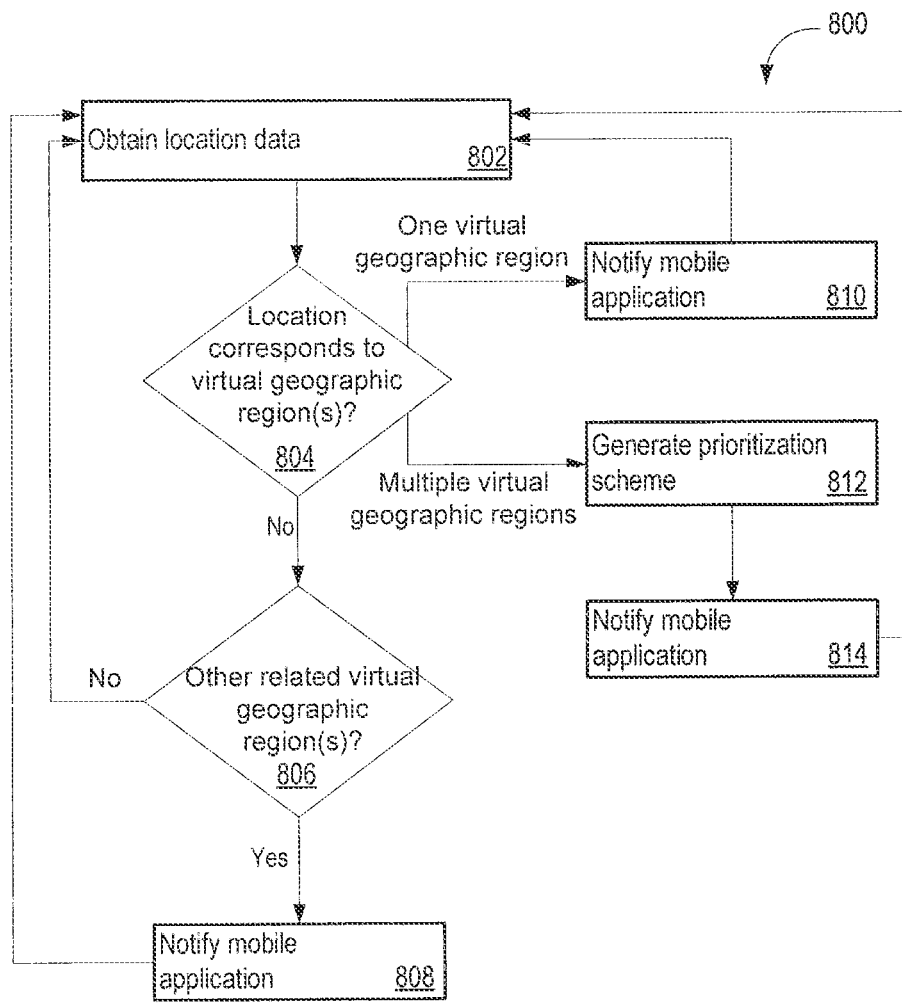
FIG. 8 is an example of process a location-based services system may implement for providing location-based services to a mobile device.

FIG. 8 is an example of process 800 a location-based services system may implement for providing location-based services to a mobile device. The disclosed methods, processes, programs, and/or instructions may be encoded in a signal-bearing medium, a computer-readable medium such as a memory, programmed within a device such as on one or more integrated circuits, or processed by a controller or a computer processor. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such as that occurring through an analog electrical, audio, or video signal. The software may be embodied in any computer-readable or signal-bearing medium, for use by, or in connection with, an instruction executable system, apparatus, or device. Such a system may include a computer-based system, a processor-containing system, or another system that may selectively fetch instructions from an instruction executable system, apparatus, or device that may also execute instructions.

The system receives location data from a mobile device equipped with a location-based services application (step 802). The location data may be geographic coordinates (e.g., longitude and latitude), identification of a geographic sector in which the mobile device is located, identification of the nearest base station, coordinates determined via triangulation, or other location data corresponding to other known mobile device location techniques.

Based on the location data, the system determines whether the location of the mobile device is within the virtual geographic region purchased, rented, leased, or otherwise acquired by a subscribing service entity (step 804). The system may compare the location of the mobile device with the virtual geographic regions stored in a database to determine whether the mobile device location falls within the virtual geographic region. If the system determines that the mobile device is not within a virtual geographic region, the system determines whether there are other, nearby virtual geographic regions that might be of interest to the user of the mobile device (step 806). The system may, for example, notify the application installed on the mobile device of the next closest virtual geographic region. The system may also compare the distance between the next closest virtual geographic region against a threshold, such that the system will not notify the application of the next closest virtual geographic region if the virtual geographic region is greater than a threshold distance (e.g., 5 miles, 25 miles, etc.) from the location of the mobile device.

The system may determine that, as another example, based on the direction of the mobile device, the mobile device is approaching a particular virtual geographic region and the system may notify the application installed on the mobile device to launch the corresponding applet even before the mobile device passes into the virtual geographic region.

If the system determines that there no other, nearby virtual geographic regions about which to notify the application, the application does not launch an applet and the system continues to obtain new location data of the mobile device (step 802). If the system determines that there are other, nearby virtual geographic regions about which to notify the application, the system transmits a notification to the application (step 808). The notification may include an identification of the corresponding service entity or other information that allows the application to know which applet to launch.

If in step 804 the system determines that location of the mobile device falls within at least one virtual geographic region, the system notifies application in the case where the system identifies a one virtual geographic region (step 810). In the case where the system identifies multiple virtual geographic regions corresponding to the location of the mobile device, such as in the case of overlapping virtual geographic regions, the system executes conflict resolution procedures (step 812).

To resolve a conflict, the system may determine the service entities (corresponding to each of the multiple virtual geographic regions) about which to notify the mobile application, as well as prioritize the service entities. Conflict resolution may be based on the location data, directional data (indicating the direction of movement of the mobile device), behavioral data about the user of the mobile device, temporal data (e.g., the time of day), and user preferences.

If the location of the mobile device falls within two overlapping virtual geographic regions, for example, the system may prioritize the virtual geographic region that the mobile device is moving towards above the virtual geographic region that the device is moving from. The movement or direction data may be received from the mobile device, or may be calculated by the system based on the current location and immediately preceding locations of the mobile device.

Prioritization of the multiple virtual geographic regions may also be based on behavioral data. The system may collect behavioral data corresponding to the mobile device and store the behavioral data in the database. Behavioral data may include, as examples, purchasing history, location history, temporal data such as the types of purchases the user makes at different times of the day or on different days of the week. If, for example, the mobile device is located within the vicinity of a coffee shop and a restaurant, the system may determine based on the behavioral data that the user of the mobile device typically visits coffee shops in the morning and restaurants in the early afternoon. Around lunch time the system may prioritize the restaurant ahead of the coffee shop, whereas the system may prioritize the coffee shop ahead of the restaurant in the morning. Thus, the system may provide different prioritization schemes based on the time of day.

Prioritization may also be based on user preferences. The application may allow the user to enter preferences in regards to the types of services entities he/she prefers (e.g., a preference of a certain restaurant chain over another, etc). The mobile device may transmit the user preferences to the system, which may be stored in the database.

The system may use a log of locations and "dwell time" to generate the prioritization scheme, indicating which of the corresponding service entities will likely be important to the user of the mobile device. One method that may be used to "score" each service entity is to sum all historical location data points using "time at location" (T) divided by "distance from nearest entity" ($D_X$), or $$Score_X = \sum \frac{T}{D_X},$$

where $Score_X$ corresponds to a score for a given entity (X). In other words, for each location data point over some previous period of time, the divides the amount spent at a location divided by the distance to the nearest entity from the location data point. In this manner, a particular entity would have a higher score where the user has a longer time at the location, and would have a lower score where the user visited locations that were a greater distance from the nearest entity being scored. The system may generate a corresponding score for each of the overlapping service entities. The score generated by the above-mentioned sum may indicate which service entity the user is most likely to be interested in.

The system may use probability curve data based on the behavior data. The probability function $P_X$ may correspond to, for example, a distribution curve indicating the number of times the user visited a particular entity and the time of day. If a mobile device is near a restaurant and a coffee shop, the system may also rank or prioritize the entities according to the following function: $Rank_X = V_X * P_X(t) + S_X$, where $V_X$ corresponds to the number of visits, $P_X(t)$ corresponds to probability function at a given time and $S_X$ corresponds to the entity score referenced above.

In addition, an amount of actions the user takes with reference to a given service entity (X) may corresponds to a utility score ($U_X$), augmenting the above function in the following manner: $Rank_X = U_X * V_X * P_X(t) + S_X$. Further, as discussed above, a direction of travel of the mobile device may help determine intent of the user, such that the function may be further augmented as follows: $Rank_X = (U_X * V_X * P_X(t) + S_X) * dot(Dir, D_X)$. In this manner, $U_X$ accounts for the utility of a service entity, $V_X$ accounts for repeated use of a service entity, $P_X$ accounts for the usefulness of a service entity at a given time, $S_X$ accounts for overall behavior, $dot(Dir, D_X)$ accounts for direction.

Once prioritized, the system notifies application of the corresponding service entities, along with the prioritization scheme (step 814). The system is described herein as being separate from the mobile device. However, in another embodiment identification of nearby virtual geographic regions and prioritization in the case of multiple overlapping virtual geographic regions may be performed by the mobile application, taking advantage of the processing and memory capabilities of the mobile device. In this embodiment, the mobile device, after determining its location, may query the database directly to determine whether the location data corresponds to a virtual geographic region purchased, rented, leased, or otherwise acquired by a service entity. Based on the results of the query, and in the case of overlapping virtual geographic regions, the mobile application itself may be programmed to determine the prioritization scheme as discussed above. In this example the location-based services system includes the mobile device.

Figure 9:
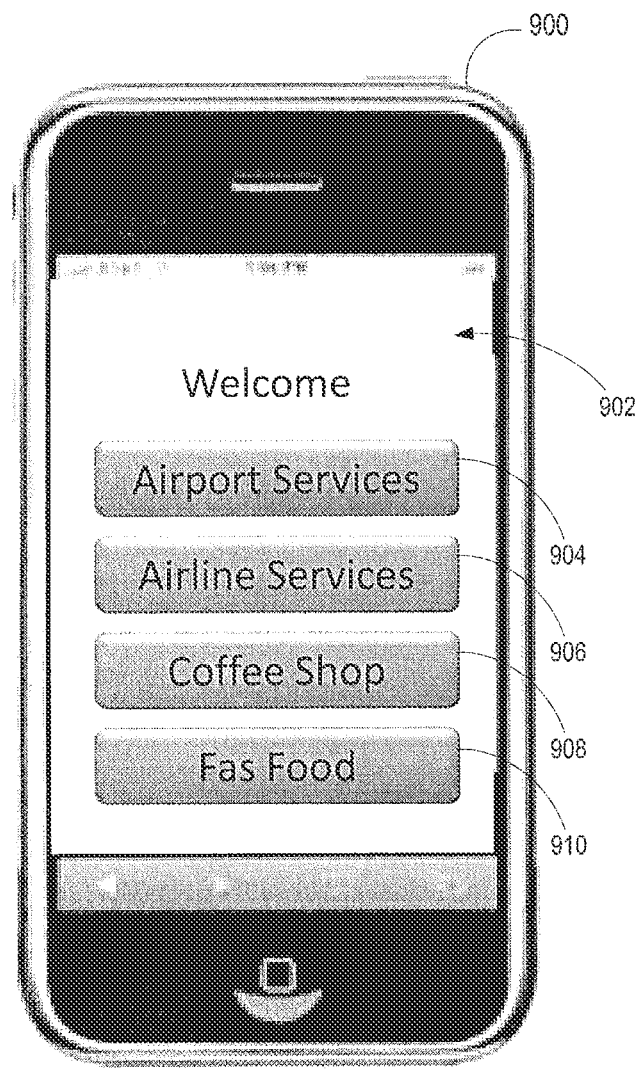
FIG. 9 shows a mobile device displaying an applet window that includes multiple service entities.

FIG. 9 shows a mobile device 900 displaying an applet window 902 that includes multiple service entities, including airport services 904, airline services 906, coffee shops 908, and fast food 910. The order the services entities are listed in the applet window 902 may be based on the prioritization scheme determined by the system. Prioritization may also include grouping related service entities together. For example, if the mobile device is located within the virtual geographic region of multiple fast food service entities, the prioritization scheme may group the fast food service entities together such that if the user selects the "Fast Food" option 910, a submenu is displayed that lists each of the corresponding fast food service entities. As the mobile device 900 moves, it may pass outside of one of the virtual geographic regions. As the location-based mobile application periodically updates the location of the mobile device and transmits the updated location to the system, the system may determine that the virtual geographic regions within which the mobile device is located has changed. The system generates a new prioritization scheme and transmits the new prioritization scheme along with an identification of the corresponding service entities to the mobile device. Upon receipt of the updated data, the mobile application updates the applet window 902 of the mobile device 900. In other words, as the mobile device 900 moves in and out of different virtual geographic regions, the mobile application may automatically update the applet window accordingly. In this manner, as the user walks, for example, through an airport, the list of service entities displayed on the applet window 902 may change. The changes may include addition or removal of the listed service entities, as well as a reordering of the listed service entities, as the mobile device changes location.

Figure 10:
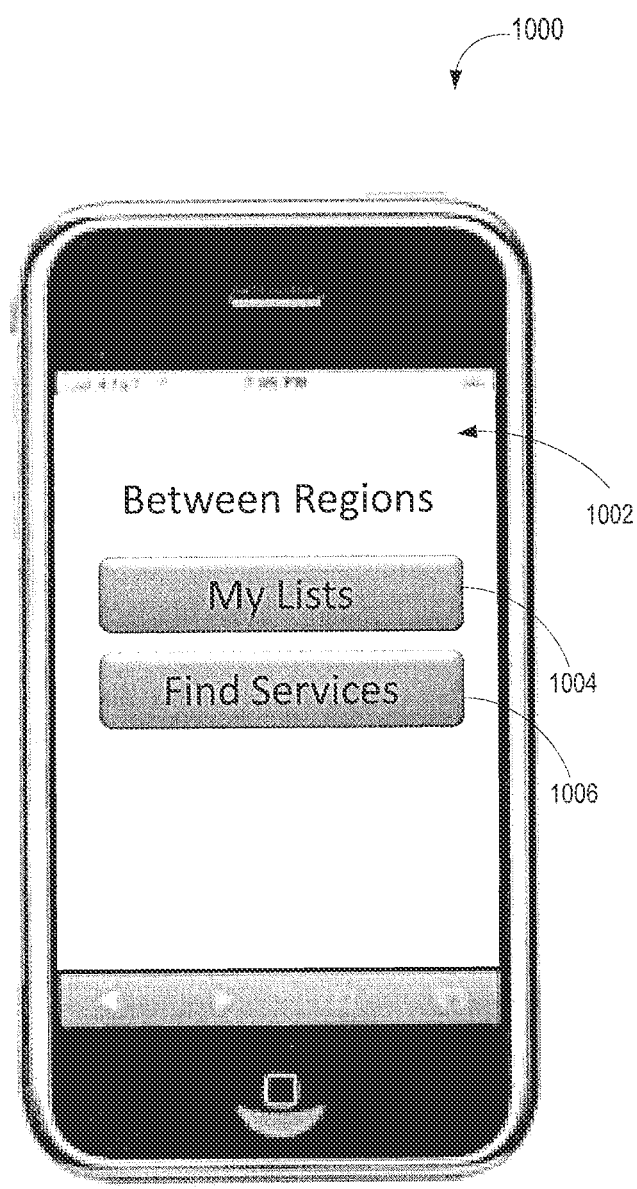
FIG. 10 shows a mobile device displaying an applet window that may be displayed when the mobile device is not located within a virtual geographic region.

FIG. 10 shows a mobile device 1000 displaying an applet window 1002 that may be displayed when the mobile device is not located within a virtual geographic region. The applet window 1002 includes two options including "My Lists" 1004 and "Find Services" 1006. The "My Lists" option 1004 may include a list of default applets selected by the user, or determined by the system based on user behavior (e.g., service entities most frequented by the user). The "Find Services" option 1006 may allow the user to see applets corresponding to services that may not be tagged to any specific geographic location (e.g., taxis, social apps, internet retailers, etc).

Exemplary aspects, features, and components of the system are described above. However, the system may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computer-implemented method comprising:

detecting, by a mobile computing device, that the mobile computing device is located within one or more geographic regions that are associated with a restaurant;

automatically launching, by the mobile computing device and without being prompted by a user of the mobile computing device, an application in response to detecting that the mobile computing device is located within the one or more geographic regions, wherein the application is programmed to, at least, provide a user interface for placing orders with the restaurant;

determining, by the application that was launched by the mobile computing device in response to detecting that the mobile computing device is located within the one or more geographic regions that are associated with the restaurant, a particular order with the restaurant to suggest on the mobile computing device to the user based, at least in part, on previous orders placed by the user;

outputting, in the user interface of the application launched by the mobile computing device in response to detecting that the mobile computing device is located within the one or more geographic regions that are associated with the restaurant, (i) information that identifies the particular order with the restaurant determined by the application to suggest on the mobile computing device to the user based, at least in part, on the previous orders placed by the user and (ii) a selectable graphical feature associated with the particular order, wherein the application is programmed to automatically place the particular order with the restaurant in response to user selection of the selectable graphical feature;

receiving, at the user interface of the application, user input that indicates a selection of the selectable feature; and providing, by the application running on the mobile computing device and in response to receiving the user input that indicates the selection of the selectable graphical feature, an order request to a computer system, wherein the order request comprises a request to place the particular order with the restaurant for fulfillment on behalf of the user of the mobile computing device.

2. The computer-implemented method of claim 1, further comprising:

receiving, at the mobile computing device and from the computer system, a notification that indicates that the mobile computing device is located within the one or more geographic regions that are associated with the restaurant, wherein the detecting is performed based on the received notification.

3. The computer-implemented method of claim 2, further comprising:

determining, by the mobile computing device, a current location of the mobile computing device; and providing, by the mobile computing device and to the computer system, location information identifying the current location of the mobile computing device, wherein the location information is provided to the computer system without being prompted to do so by the user, wherein the notification is received from the computer system after the location information is provided to the computer system.

4. The computer-implemented method of claim 1, wherein launching the application comprises displaying the application on the mobile computing device so that the application has focus on a display of the mobile computing device.

5. The computer-implemented method of claim 1, further comprising:
selecting, by the application and from order data for the user that is accessible to the mobile computing device, the previous orders based, at least in part, on information for the restaurant.

6. The computer-implemented method of claim 5, wherein:
the information for the restaurant comprises information that identifies the restaurant, and
the previous orders are selected based on the previous orders being orders placed with the restaurant.

7. The computer-implemented method of claim 5, wherein:
the information for the restaurant comprises information that identifies categories of food items offered by the restaurant, and
the previous orders are selected based on the previous orders being orders placed with the restaurant or other restaurants for the categories of food items.

8. The computer-implemented method of claim 5, wherein:
the information for the restaurant comprises information that identifies a restaurant type for the restaurant, and
the previous orders are selected based on the previous orders being orders placed with one or more restaurants of the restaurant type.

9. The computer-implemented method of claim 8, wherein the one or more restaurants include other restaurants that are different from the restaurant.

10. The computer-implemented method of claim 1, wherein the particular order is determined further based user preferences for the user.

11. The computer-implemented method of claim 1, wherein the application comprises a mobile application.

12. The computer-implemented method of claim 1, wherein the application is programmed to load code for the restaurant that causes the application to provide an interface for placing orders with the restaurant.

13. The method of claim 1, wherein determining, by the application that was launched by the mobile computing device in response to detecting that the mobile computing device is located within the one or more geographic regions that are associated with the restaurant, a particular order with the restaurant to suggest on the mobile computing device to the user based, at least in part, on previous orders placed by the user is in response to automatically launching, by the mobile computing device and without being prompted by the user of the mobile computing device, the application in response to detecting that the mobile computing device is located within the one or more geographic regions.

14. A mobile computing device comprising:
one or more processors; and
memory storing instructions that, when executed, cause the one or more processors to:
detect that the mobile computing device is located within one or more geographic regions that are associated with a restaurant; and
automatically launch, without being prompted by a user of the mobile computing device, an application in response to detecting that the mobile computing device is located within the one or more geographic regions;
wherein the application that is launched by the mobile computing device in response to detecting that the mobile computing device is located within the one or more geographic regions that are associated with the restaurant is programmed to:
determine a particular order with the restaurant to suggest on the mobile computing device to the user based, at least in part, on previous orders placed by the user,
output, in a user interface, (i) information that identifies the particular order with the restaurant determined by the application to suggest on the mobile computing device to the user based, at least in part, on the previous orders placed by the user and (ii) a selectable graphical feature associated with the particular order, wherein the application is programmed to automatically place the particular order with the restaurant in response to user selection of the selectable graphical feature,
receiving, at the user interface, user input that indicates a selection of the selectable feature, and
providing, in response to receiving the user input that indicates the selection of the selectable graphical feature, an order request to a computer system, wherein the order request comprises a request to place the particular order with the restaurant for fulfillment on behalf of the user of the mobile computing device.

15. The mobile computing device of claim 14, wherein the application is further programmed to:
select, from order data for the user that is accessible to the mobile computing device, the previous orders based, at least in part, on information for the restaurant.

16. The mobile computing device of claim 15, wherein:
the information for the restaurant comprises information that identifies the restaurant, and
the previous orders are selected based on the previous orders being orders placed with the restaurant.

17. The mobile computing device of claim 15, wherein:
the information for the restaurant comprises information that identifies categories of food items offered by the restaurant, and
the previous orders are selected based on the previous orders being orders placed with the restaurant or other restaurants for the categories of food items.

18. The mobile computing device of claim 15, wherein:
the information for the restaurant comprises information that identifies a restaurant type for the restaurant, and
the previous orders are selected based on the previous orders being orders placed with one or more restaurants of the restaurant type.

19. A non-transitory computer-readable medium storing instructions executable by one or more computers which, upon such execution, cause the one or more computers to perform operations comprising:
detecting, by a mobile computing device, that the mobile computing device is located within one or more geographic regions that are associated with a restaurant;
automatically launching, by the mobile computing device and without being prompted by a user of the mobile computing device, an application in response to detecting that the mobile computing device is located within the one or more geographic regions, wherein the application is programmed to, at least, provide a user interface for placing orders with the restaurant;

determining, by the application that was launched by the mobile computing device in response to detecting that the mobile computing device is located within the one or more geographic regions that are associated with the restaurant, a particular order with the restaurant to suggest on the mobile computing device to the user based, at least in part, on previous orders placed by the user;

outputting, in the user interface of the application launched by the mobile computing device in response to detecting that the mobile computing device is located within the one or more geographic regions that are associated with the restaurant, (i) information that identifies the particular order with the restaurant determined by the application to suggest on the mobile computing device to the user based, at least in part, on the previous orders placed by the user and (ii) a selectable graphical feature associated with the particular order, wherein the application is programmed to automatically place the particular order with the restaurant in response to user selection of the selectable graphical feature;

receiving, at the user interface of the application, user input that indicates a selection of the selectable feature; and providing, by the application running on the mobile computing device and in response to receiving the user input that indicates the selection of the selectable graphical feature, an order request to a computer system, wherein the order request comprises a request to place the particular order with the restaurant for fulfillment on behalf of the user of the mobile computing device.

\* \* \* \* \*